F. L. ROWNTREE.
METAL BED CASTER.
APPLICATION FILED JULY 10, 1916.
1,203,053.
Patented Oct. 31, 1916.
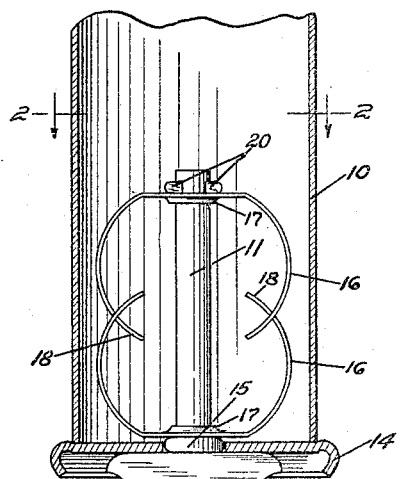
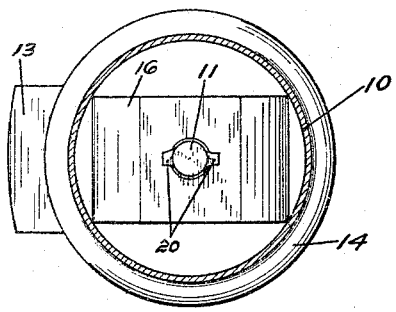
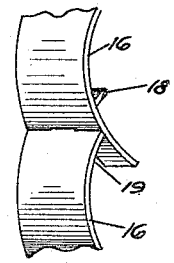
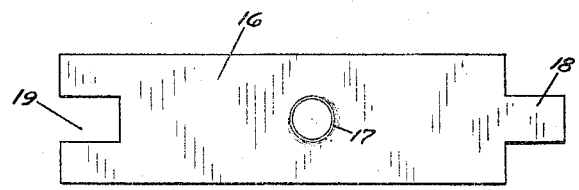
WITNESS
Chester P. Hayden
INVENTOR
Frank L. Rowntree
BY
A. M. Wooster
ATTORNEY

UNITED STATES PATENT OFFICE.

FRANK L. ROWNTREE, OF MERIDEN, CONNECTICUT, ASSIGNOR TO FOSTER, MERRIAM AND COMPANY, OF MERIDEN, CONNECTICUT, A CORPORATION OF CONNECTICUT.

METAL-BED CASTER.

1,203,053.  Specification of Letters Patent.  Patented Oct. 31, 1916.

Application filed July 10, 1916. Serial No. 108,298.

*To all whom it may concern:*

Be it known that I, FRANK L. ROWNTREE, a citizen of the United States, residing at Meriden, county of New Haven, State of Connecticut, have invented an Improvement in Metal-Bed Casters, of which the following is a specification.

This invention has for its object to provide a simple and inexpensive caster especially adapted for use in connection with metal furniture legs, which shall be provided with interlocking bow springs by which the caster is made self-retaining in place and the pintle is yieldingly centered in the leg and retained against lateral movement therein.

With these and other objects in view, I have devised the novel caster of which the following description in connection with the accompanying drawing is a specification, reference characters being used to indicate the several parts.

Figure 1 is a view partly in elevation and partly in section, illustrating the construction and operation of my novel caster; Fig. 2 a plan view, the leg being in section on the line 2—2 in Fig. 1, looking in the direction of the arrows; Fig. 3 a detail perspective view illustrating the manner in which the springs interlock, and Fig. 4 is a plan view of one of the spring blanks before being formed to shape.

10 denotes a tubular furniture leg, as the leg of a metal bed, 11 the pintle, 12 the horn which is riveted or otherwise rigidly secured to the pintle, 13 the wheel, and 14 a washer or crown which rests upon the horn, upon which the leg rests, and which is provided with a central hole through which an enlargement 15 on the pintle passes freely. This washer or crown is preferably made of ornamental configuration to provide a finish for the lower end of the furniture leg, and may or may not, as preferred, be slightly dished to provide a seat for the end of the leg.

The novelty of the present invention lies in the springs 16, two of which are used in each caster. These springs are just alike and are simply strips of metal, each having a central hole to receive the pintle. Each hole is preferably surrounded by an annular bearing boss 17, one end of the strip being provided with a tongue 18 and the other end with a slot 19 to receive the tongue of the coöperating spring. The central portions of the springs are left flat and the ends are curved upward and outward and then inward toward each other, the two springs in the assembled position facing each other and their ends being interlocked by the engagement of the tongue of each spring with the slot in the other, as is clearly shown in the drawing. In assembling, the pintle is first passed through the hole in the washer, then a spring is placed over the pintle, resting on the enlargement with the ends extending upward, then another spring is placed over the pintle with the ends extending downward, the ends of the springs being interlocked by engagement of the tongue and slots, and then the end of the pintle is upset, as at 20, to retain the springs in place. It will be noted that the enlargement of the pintle is thicker than the washer or crown and extends above it, so that the spring resting on the enlargement is out of contact with the washer. The ends of the springs are bowed outward sufficiently to cause the bows to engage the wall of the furniture leg firmly, the ends of the springs being forced inward by the engagement. This insures that the caster as a whole may be readily inserted in the leg, will be effectively retained in place when the leg is lifted, and the pintle will be yieldingly centered in the leg but free to rotate, carrying the horn and wheel with it, independently of the springs and washer.

Having thus described my invention, I claim:—

1. In a caster, in combination, a pintle, a horn, a washer, and springs loosely connected to the ends of the pintle and curved outward toward each other and then inward, the ends of the springs being provided with interlocking means.

2. In a caster, in combination, a pintle, a horn, a washer, and springs loosely connected to the ends of the pintle and curved outward toward each other and then inward, one end of each spring being provided with a tongue and the other end with a slot to receive the tongue of the coöperating spring.

3. In a caster, in combination, a pintle provided with an enlargement, a horn rigidly secured to the pintle, a washer resting on the horn and having a hole which loosely receives the enlargement, and springs loosely secured to opposite ends of the pintle, the lower spring resting on the enlargement and the ends of said springs being curved outward toward each other and then inward and said ends being provided with interlocking means.

In testimony whereof I affix my signature.

FRANK L. ROWNTREE.

Witnesses:
A. W. MILLARD,
J. B. COGGIN.

Copies of this patent may be obtained for five cents each, by addressing the "Commissioner of Patents, Washington, D. C."